(12) United States Patent
Zhou et al.

(10) Patent No.: US 10,393,615 B2
(45) Date of Patent: Aug. 27, 2019

(54) HORIZONTAL HIGH SPEED TESTING DEVICE FOR SPIRAL SEAL OF HORIZONTAL CONE BIT BEARING

(71) Applicant: Southwest Petroleum University, Sichuan (CN)

(72) Inventors: Yi Zhou, Sichuan (CN); Yueming Zheng, Sichuan (CN); Yang Xiao, Sichuan (CN); Tong Xu, Sichuan (CN); Xia Wang, Sichuan (CN); Yi Tang, Sichuan (CN); Song Peng, Sichuan (CN); Yuxing Huang, Sichuan (CN); Bin Tan, Sichuan (CN)

(73) Assignee: Southwest Petroleum University

( * ) Notice: Subject to any disclaimer, the term of this patent is extended or adjusted under 35 U.S.C. 154(b) by 216 days.

(21) Appl. No.: 15/705,412

(22) Filed: Sep. 15, 2017

(65) Prior Publication Data

US 2018/0348082 A1    Dec. 6, 2018

(30) Foreign Application Priority Data

May 31, 2017   (CN) .......................... 2017 1 0405195

(51) Int. Cl.
| | | |
|---|---|---|
| *G01M 3/28* | (2006.01) | |
| *G01M 13/005* | (2019.01) | |
| *G01M 3/02* | (2006.01) | |
| *E21B 10/22* | (2006.01) | |
| *E21B 10/25* | (2006.01) | |

(52) U.S. Cl.
CPC .......... *G01M 3/2869* (2013.01); *G01M 3/025* (2013.01); *G01M 13/005* (2013.01); *E21B 10/25* (2013.01); *E21B 2010/225* (2013.01)

(58) Field of Classification Search
CPC ........ E21B 10/25; E21B 10/225; G01M 3/00; G01M 3/025; G01M 3/26; G01M 3/28; G01M 3/2869; G01M 13/00; G01M 13/005
See application file for complete search history.

(56) References Cited

U.S. PATENT DOCUMENTS

| | | | |
|---|---|---|---|
| 6,789,634 B1 * | 9/2004 | Denton | ................... E21B 10/25 175/228 |
| 7,234,541 B2 * | 6/2007 | Scott | ....................... E21B 10/25 175/372 |
| 2009/0321146 A1 * | 12/2009 | Dick | ....................... E21B 10/22 175/371 |

* cited by examiner

*Primary Examiner* — Nguyen Q. Ha
(74) *Attorney, Agent, or Firm* — Wood Herron & Evans LLP (57) ABSTRACT

A horizontal high-speed testing device for a spiral seal of a cone bit bearing is provided. The device comprises a shaft, a spiral sleeve and a cone. The spiral sleeve is in threaded connection to the cone. Sealing threads are provided on an inner diameter of the spiral sleeve. Both the spiral sleeve and the cone are sheathed on the shaft. By the testing device of the present invention, a spiral seal structure for a cone bit bearing is simulated, and the cone drives the spiral sleeve to rotate; the sand draining performance of the spiral seal can be tested in two ways, i.e., by measuring the time required to drain the sand-containing liquid and by measuring the weight of drained sand, so that the smooth production and application of spiral seal products can be assured.

8 Claims, 5 Drawing Sheets

HORIZONTAL HIGH SPEED TESTING DEVICE FOR SPIRAL SEAL OF HORIZONTAL CONE BIT BEARING

CROSS-REFERENCE TO RELATED APPLICATION

This application claims priority to Chinese application number 201710405195.1, filed May 31, 2017. The above-mentioned patent application is incorporated herein by reference in its entirety.

TECHNICAL FIELD

The present invention relates to the field of drilling engineering machinery, and in particular to a horizontal high-speed testing device for a spiral seal of a cone bit bearing.

BACKGROUND

As the most important rock-breaking tool in the drilling engineering, cone bits play a leading role in the downhole rock-breaking operation, and their working performance directly influences the drilling quality, the drilling efficiency and the drilling cost. The service life of the cone bits almost directly depends on the service life of the bit bearings, and in turn, the service life of the bit bearings depends on the seal life. The recent development trend of cone bits is to realize their high speed. With the continuous increase in the rotation speed of bits, the weakness of common bearing seals used in the rough environment is increasingly prominent. Therefore, during the researches on bits, the improvements of the service life of bearings cannot be ignored. As the weakest link of a high-speed cone bit and a quick-wear component, a bearing seal is the most critical factor that determines the service life of the high-speed cone bit. A statistical analysis of field data has indicated that the failed bits caused by the early damage to bearings account for 80% of the total number of failed bits, and the bearings seriously worn due to the early failure of seals account for 30% of the total number of failed bearings. The bearing seal problem of the cone bits has become a technical bottleneck that seriously influences the drilling efficiency and drilling cost of high-speed cone bits, and has become a problem to be urgently solved in the oil drilling and production engineering at present.

The practices have indicated that the sealing performance of the current conventional cone bit bearings cannot meet the operation requirements very well; and particularly during drilling at a high rotation speed, the seals reveal short service life, poor durability, and serious wear and aging. The working conditions for seals of the cone bits are very severe, including high temperature, high-abrasiveness medium, high loads and very small sealed cavity. These working conditions and environments aggravate the failure of seals, and also bring tremendous difficulties and challenges to the researches on seals. The entrance of the abrasive medium slurry is the most critical factor that influences the service life of seals for high-speed cone bits. The existing bearing seals belong to passive seals which have no automatic sand draining function, so that the seals will be quickly worn and thus failed once slurry particles enter the sealed cavity. At present, there are still no testing devices for a spiral seal of a high-speed cone bit. The experimental researches are the premise and guarantee for smoothly conducting field tests and product applications, and the testing devices are the key to determine whether the experimental researches are successful. The development of testing devices for a spiral seal of a high-speed cone bit is very important to improve the service life of bits.

Therefore, how to change the current situation in the prior art that it is unable to conduct tests on a spiral seal of a high-speed cone bit is a problem to be urgently solved by those skilled in the art.

SUMMARY

An objective of the present invention is to provide a horizontal high-speed testing device and testing method for a spiral seal of a cone bit bearing to solve the problems in the prior art. The sealing performance of a spiral seal of a cone bit can be measured by tests, so that it is convenient for practical productions and applications.

For this purpose, the present invention provides the following solutions. The present invention provides a horizontal high-speed testing device for a spiral seal of a cone bit bearing, including a shaft, a spiral sleeve and a cone. The spiral sleeve is in threaded connection to the cone, sealing threads are provided on an inner diameter of the spiral sleeve; and both the spiral sleeve and the cone are sheathed on the shaft. A first cavity is formed between the spiral sleeve, the cone and the shaft; a first through hole, a second through hole and a third through hole are formed in the shaft; and the first through hole is communicated with the first cavity. There is an axial clearance between the spiral sleeve and the shaft and an axial clearance between the cone and the shaft to form a second cavity. The first cavity is communicated with the second cavity; and, both the second through hole and the third through hole are communicated with the second cavity.

In one embodiment, the horizontal high-speed testing device for a spiral seal of a cone bit bearing further includes a motor, a base, a cover and a rack; wherein, the motor is connected to the cone through a coupler; both the motor and the base are arranged on the rack; the base is detachably connected to the cover; and, each of the shaft, the spiral sleeve and the cone is arranged within a chamber formed by the base and the cover.

In one embodiment, a bearing is additionally provided at a rotation joint of the cone with the base and the cover and fixed by a bearing end cover, and the bearing end cover is connected to the base and the cover by screws.

In one embodiment, the shaft is connected with the base and the cover by screws, and an axis of the cone is parallel to a plane of the rack.

In one embodiment, the horizontal high-speed testing device for a spiral seal of a cone bit bearing further includes a collecting tank; wherein, the collecting tank is arranged inside the rack; a collecting container is further provided on the base; the collecting tank is communicated with the second cavity; and, the collecting container is communicated with the collecting tank through a pipeline.

In one embodiment, the horizontal high-speed testing device for a spiral seal of a cone bit bearing further includes a first medium container and a second medium container; wherein, the first through hole is communicated with the first medium container and the outside through pipelines, respectively; and the second through hole and the third through hole are communicated with the second medium container through pipelines, respectively.

In one embodiment, valves are additionally provided between the first through hole and the first medium container and between the first through hole and the outside, and valves are additionally provided between the second through hole and the second medium container and between the third through hole and the second medium container.

In one embodiment, the first through hole is arranged coaxially to the shaft, and the second through hole and the third through hole are symmetrically arranged relative to an axis of the shaft.

Compared with the prior art, the present invention achieves the following technical effects: the horizontal high-speed testing device for a spiral seal of a cone bit bearing of the present invention includes a spiral sleeve; sealing threads are provided on an inner side of the spiral sleeve to simulate a spiral seal structure for a cone bit bearing; a cone drives the spiral sleeve to rotate; and the sand draining performance of the spiral seal can be tested by two methods, i.e., by measuring the time required to drain the sand-containing liquid and by measuring the weight of the drained sand, so that the smooth production and application of spiral seal products can be assured.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, explain the principles of the invention.

DETAILED DESCRIPTION

The technical solutions in the embodiments of the present invention will be clearly and completely described below with reference to the accompanying drawings in the embodiments of the present invention. Therefore, the embodiments described herein are merely a part but not to be considered all the embodiments of the present invention. All other embodiments obtained by those skilled in the art without any creative effort on the basis of the embodiments in the present invention shall fall into the protection scope of the present invention.

An objective of the present invention is to provide a horizontal high-speed testing device for a spiral seal of a cone bit bearing to solve the problems in the prior art. The sealing performance of a spiral seal of a cone bit can be measured by tests, so that it is convenient for practical productions and applications.

To make the objectives, features and advantages of the present invention more obvious and comprehensible, the present invention will be further described below in detail in conjunction with the accompanying drawings and the embodiments.

Referring to FIGS. 1 to 6, the present invention provides a horizontal high-speed testing device for a spiral seal of a cone bit bearing, including a shaft 1, a spiral sleeve 2 and a cone 3. The spiral sleeve 2 is detachably connected to the cone 3. Sealing threads 201 are provided on an inner diameter of the spiral sleeve 2. Both the spiral sleeve 2 and the cone 3 are sheathed on the shaft 1. A first cavity 4 is formed between the spiral sleeve 2, the cone 3 and the shaft 1. A first through hole 101, a second through hole 102 and a third through hole 103 are formed in the shaft 1. The first through hole 101 is communicated with the first cavity 4. There is an axial clearance between the spiral sleeve 2 and the shaft 1 and an axial clearance between the cone 3 and the shaft 1 to form a second cavity 5. The first cavity 4 is communicated with the second cavity 5. Both the second through hole 102 and the third through hole 103 are communicated with the second cavity 5.

The horizontal high-speed testing device for a spiral seal of a cone bit bearing of the present invention includes a spiral sleeve 2. Sealing threads 201 are provided on an inner side of the spiral sleeve 2 to simulate a spiral seal structure for a cone bit bearing. The cone 3 drives the spiral sleeve 2 to rotate. The sand draining performance of the spiral seal can be tested by two methods, i.e., by measuring the time required to drain the sand-containing liquid and by measuring the weight of the drained sand, so that the smooth production and application of spiral seal products can be assured.

Figure 2:
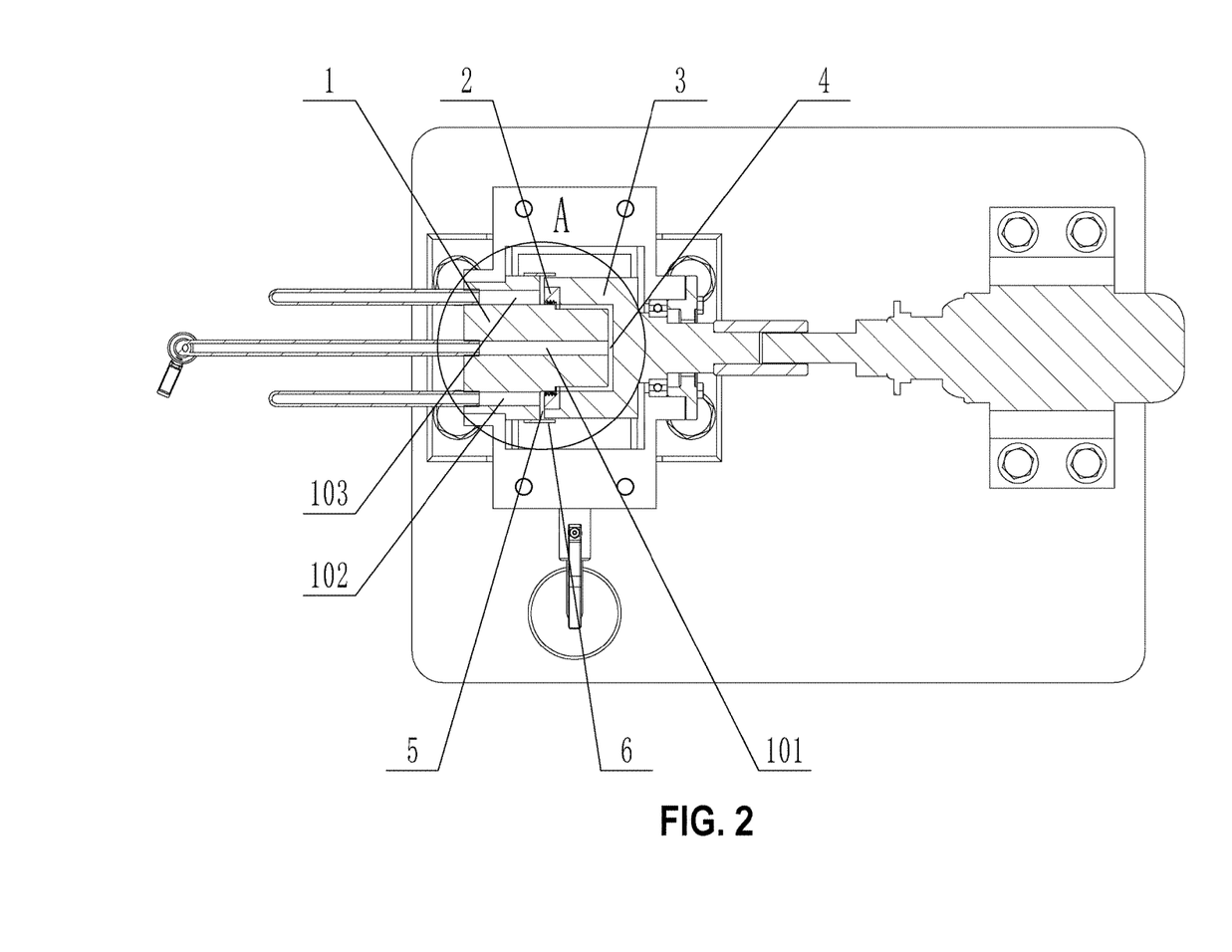
FIG. 2 is a top plan cross section view of the horizontal high-speed testing device for a spiral seal of a cone bit bearing of FIG. 1.
Figure 4:
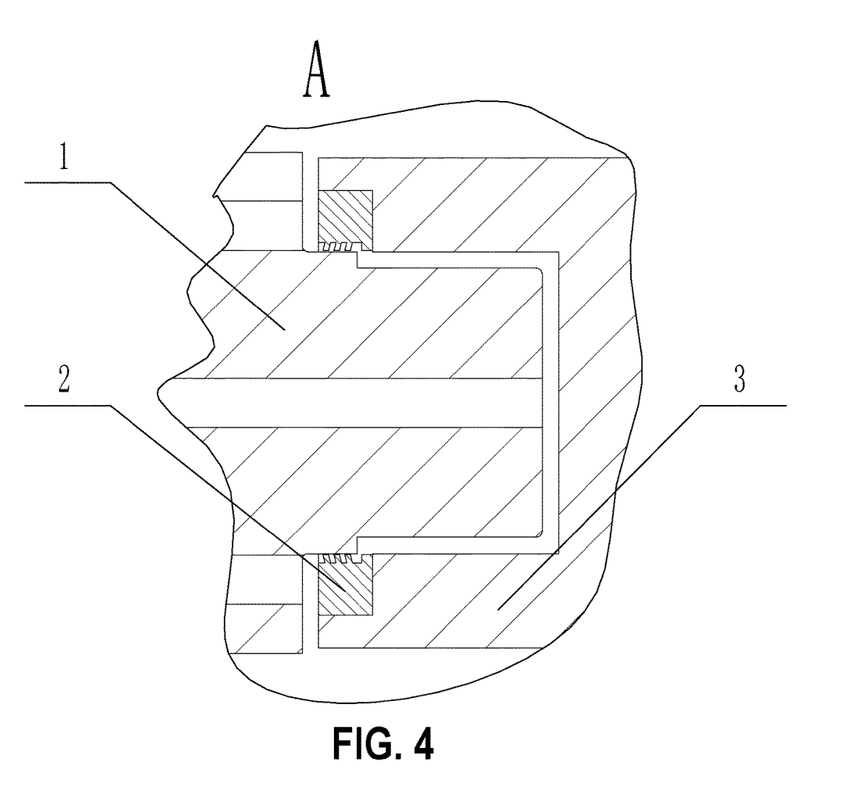
FIG. 4 is an enlarged view of detail A from FIG. 2, showing further details of the horizontal high-speed testing device for a spiral seal of a cone bit bearing.

During the test, a certain amount of sand-containing liquid is fed into the first cavity 4 through the first through hole 101. The sand-containing liquid flows to the sealing threads 201 on the spiral sleeve 2 along the first cavity 4, then flows out from the clearance between the sealing threads 201 and the shaft 1 and the clearance between the cone 3 and the shaft 1, and flows into the second cavity 5 through the clearance between the cone 3 and the shaft 1. Subsequently, the sand-containing liquid in the second cavity 5 flows to the outside of the device. When the sand-containing liquid in the second cavity 5 is completely drained, the used time is recorded as the time required to drain sand when the sealing threads 201 have no pumping effect. When the cone 3 drives the spiral sleeve 2 to rotate, the above operations are repeated, and a same amount of sand-containing liquid is fed into the first cavity 4. In this case, the rotation of the sealing threads 201 on the spiral sleeve 2 generates a pumping effect, and the time required to completely drain the sand-containing liquid is recorded. By comparing the time required to completely drain the sand-containing liquid, the sealing performance of the sealing threads 201 on the spiral sleeve 2 may be evaluated. The less time required to completely drain the sand-containing liquid indicates higher pumping and sand draining performance and thus better sealing performance of the sealing threads 201 on the spiral sleeve 2.

Meanwhile, for the horizontal high-speed testing device for a spiral seal of a cone bit bearing of the present invention, the sealing performance of the sealing threads 201 on the spiral sleeve 2 can also be evaluated by measuring the amount of sand drained by the spiral sleeve 2. During the test, the sand-containing liquid is fed into the clearance between the shaft 1 and the sealing threads 201 on the spiral sleeve 2 through the second through hole 102 and the third through hole 103. The sand-containing liquid to be injected is weighed in advance. The cone 3 drives the spiral sleeve 2 to rotate. If the sealing threads 201 on the spiral sleeve 2 have good pumping and sand draining performance, the sand-containing liquid is unable to enter the first cavity 4, and instead, the sand-containing liquid enters the second cavity 5 along the clearance between the spiral sleeve 2 and the shaft 1 and the clearance between the cone 3 and the shaft 1 and is then drained out of the device from the second cavity 5. If the sealing threads 201 on the spiral sleeve 2 have poor pumping and sand draining performance, part of the sand-containing liquid will enter the first cavity 4 through the sealing threads 201 and is then drained out of the device through the first through hole 101. The part of the sand-containing liquid drained out of the device from the second cavity 5 is weighed and recorded as the amount of sand which is pumped and drained by the sealing threads 201 on the spiral sleeve 2. By comparing the amount of the drained sand, the sealing performance of the sealing threads 201 on the spiral sleeve 2 may be evaluated.

Figure 1:
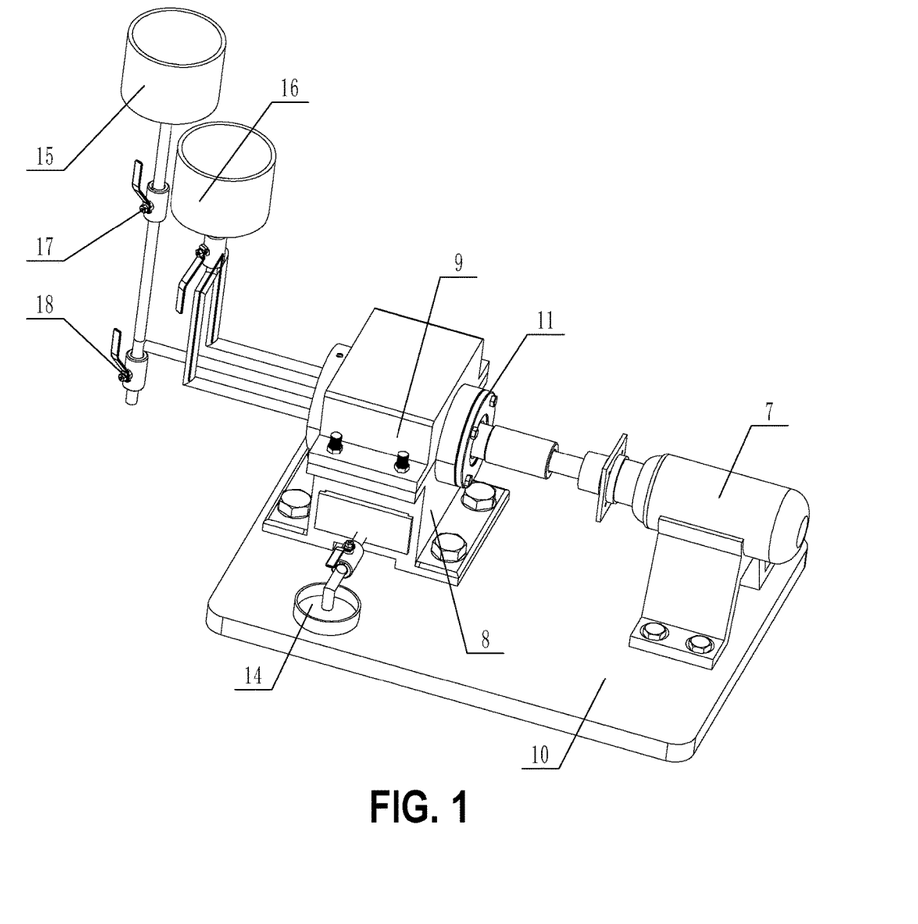
FIG. 1 is a top perspective view of the overall structure of a horizontal high-speed testing device for a spiral seal of a cone bit bearing, according to the present invention.
Figure 3:
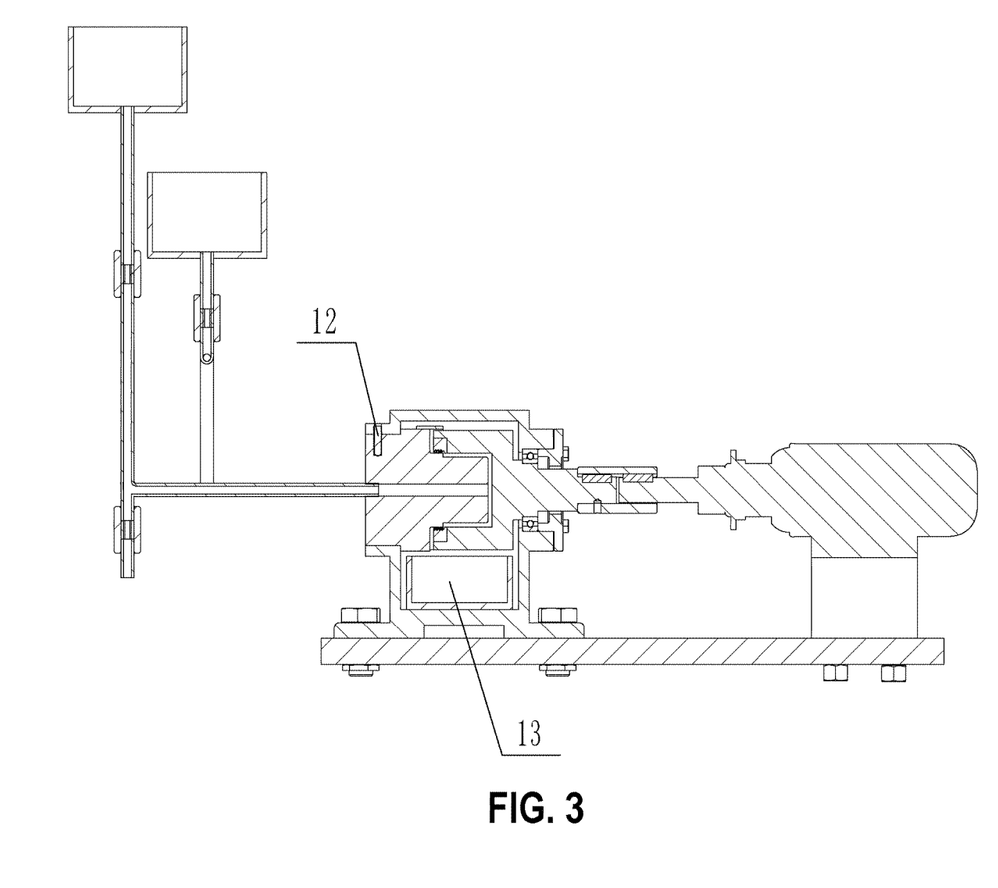
FIG. 3 is a front elevational cross section view of the horizontal high-speed testing device for a spiral seal of a cone bit bearing of FIG. 1.

Specifically, the horizontal high-speed testing device for a spiral seal of a cone bit bearing further includes a motor 7, a base 8, a cover 9 and a rack 10. The motor 7 is connected to the cone 3 through a coupler. Both the motor 7 and the base 8 are arranged on the rack 10. The base 8 is detachably connected to the cover 9. Each of the shaft 1, the spiral sleeve 2 and the cone 3 is arranged within a chamber formed by the base 8 and the cover 9.

Figure 5:
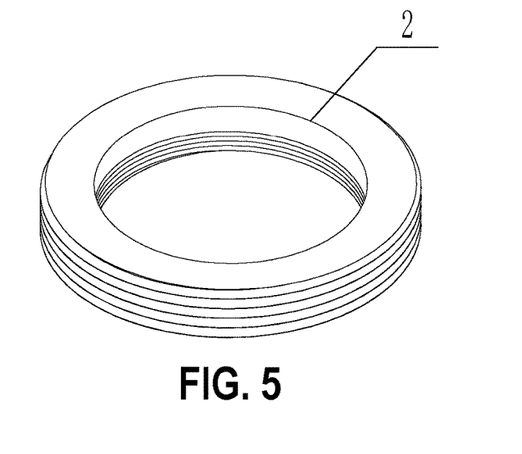
FIG. 5 is a top perspective view of a spiral sleeve included in the horizontal high-speed testing device of FIG. 1.
Figure 6:
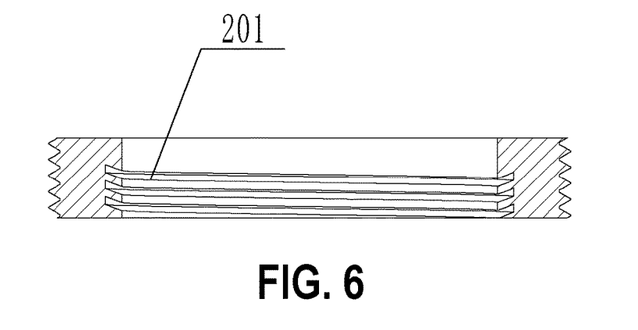
FIG. 6 is a side cross-sectional view of the spiral sleeve of FIG. 5.

In the present invention, since the sealing threads 201 on the inner wall of the spiral sleeve 2 are used to simulate a spiral seal structure for a high-speed cone bit bearing, the mounting problem of the spiral sealing structure is solved and the service life is improved. Moreover, it is not necessary to replace the cone frequently, so that the cost is saved, the test efficiency is improved and the applicability of the cone 3 is improved. In this embodiment, the spiral sleeve 2 is in threaded connection to the cone 3. The threaded connection is firm and convenient for disassembly, so that it is convenient to test the sealing performances of sealing threads of spiral sleeves 2 with different specifications. There is a clearance (generally about 0.5 mm to 1.0 mm) between the sealing threads 201 and the shaft 1. Meanwhile, it is to be noted that the direction of turning of the connecting threads of the spiral sleeve 2 and the cone 3 is opposite to the direction of rotation of the motor 7 to prevent the loosening of the spiral sleeve 2 and the cone 3 during the rotation from influencing the test result.

The motor 7 provides a power source for the cone 3. The motor 7 drives the cone 3 to rotate at a high speed, and in turn, the cone 3 drives the spiral sleeve 2 connected thereto to rotate at a high speed. Thus, it is convenient to test the sand draining performance of the sealing threads 201. Since each of the shaft 1, the spiral sleeve 2 and the cone 3 is arranged within a chamber formed by the base 8 and the cover 9, and the base 8 is detachably connected to the cover 9, it is convenient for the repair, maintenance, cleaning and the like of the device. Moreover, since both the motor 7 and the base 8 are arranged on the rack 10, the rack 10 provides a support for the motor 7 and the base 8, so that the shake, displacement or the like of the device during the test are prevented from influencing the test result, and the overall stability of the device is thus improved.

One end of the cone 3 connected to the motor 7 passes through a hole formed at a joint of the base 8 with the cover 9. A bearing is additionally provided at a rotation joint of the cone 3 with the base 8 and the cover 9, and fixed by a bearing end cover 11. The bearing end cover 11 is connected to the base 8 and the cover 9 by screws. Hence, the connection is stable, and it is convenient for disassembly.

More specifically, the shaft 1 is connected with the base 8 and the cover 9 by pins 12, so that the positioning is simple and the connection is convenient. An axis of the cone 3 is parallel to a plane of the rack 10.

Further, the horizontal high-speed testing device for a spiral seal of a cone bit bearing further includes a collecting tank 13. The collecting tank 13 is arranged inside the rack 10 and used for collecting the sand-containing liquid flowing out from the second cavity 5. A collecting container 14 is further provided on the base 8. The collecting tank 13 is communicated with the second cavity 5, and the collecting container 14 is communicated with the collecting tank 13 through a pipeline. During the test of the time required to drain sand by the sealing threads 201, the sand-containing liquid flows from the first cavity 4 into the second cavity 5 through the sealing threads 201 and the clearance between the cone 3 and the shaft 1, and then flows from the second cavity 5 into the collecting tank 13 communicated therewith. In this embodiment, the collecting tank 13 is provided below the shaft 1, so that the sand-containing liquid entering the second cavity 5 flows into the collecting tank 13 below it. The collecting tank 13 is designed as a pull-out structure like a drawer. Since the collecting tank 13 can be pulled out, it is convenient to pour away the sand-containing liquid and clean the collecting tank 13. The sand-containing liquid in the collecting tank 13 can also flow into the collecting container 14 through the pipeline. The sand-containing liquid flowing out of the device is collected by the collecting container 14. Thus, it is clean and convenient, the pollution is thus avoided, and the sand-containing liquid can be reused.

Still further, the horizontal high-speed testing device for a spiral seal of a cone bit bearing further includes a first medium container 15 and a second medium container 16. The first through hole 101 is communicated with the first medium container 15 and the outside through pipelines, respectively; and the second through hole 102 and the third through hole 103 are communicated with the second medium container 16 through pipelines, respectively. During the test of the time required to drain sand by the sealing threads 201, a certain volume of the sand-containing liquid is injected into the first medium container 15. Then, the sand-containing liquid enters the first cavity 4 from the first through hole 101 through the pipeline, and is eventually drained out of the device from the second cavity 5. The time required to completely drain the sand-containing liquid is recorded. In this embodiment, a vibration device is additionally provided on the first medium container 15 in order to make the output of the sand-containing liquid more uniform and prevent the accumulation of gravel from blocking the outlet of the first medium container 15.

During the test of the weight of sand drained by the sealing threads 201, a certain weight of the sand-containing liquid is injected into the second medium container 16. Then, the sand-containing liquid enters the clearance between the shaft 1 and the sealing threads 201 on the spiral sleeve 2 through the second through hole 102 and the third through hole 103, and is eventually drained into the collecting container 14 from the second cavity 5. The sand-containing liquid in the collecting container 14 is weighed, and the weight is recorded as the weight of sand drained by the sealing threads 201. In this embodiment, a vibration device and a weight sensing device are additionally provided on the second medium container 16. Thus, while achieving avoidance of the accumulation of the sand-containing liquid, the sand-containing liquid in the second medium container 16 may be conveniently weighed, or weighed by differential method, so that it is convenient to conduct tests.

In addition, a valve is additionally provided between the first through hole 101 and the first medium container 15 and between the first through hole 102 and the outside, so that it is convenient to control the flow and start/stop of the sand-containing liquid.

The first through hole 101 is arranged coaxially to the shaft 1, and the second through hole 102 and the third through hole 103 are symmetrically arranged relative to an axis of the shaft 1. In this embodiment, the second through hole 102 and the third through hole 103 directly face the clearances between the shaft 1 and the cone 3, so that it is convenient to conduct tests, and the sand-containing liquid is prevented from directly flowing into the second cavity 5 without contacting the sealing threads 201. Consequently, the test result is more accurate.

The horizontal high-speed testing device for a spiral seal of a cone bit bearing of the present invention includes a shaft 1, a spiral sleeve 2 and a cone 3. The spiral sleeve 2 is in threaded connection to the cone 3. Sealing threads 201 are provided on an inner diameter of the spiral sleeve 2. Both the spiral sleeve 2 and the cone 3 are sheathed on the shaft 1. A first cavity 4 is formed between the spiral sleeve 2, the cone 3 and the shaft 1. A first through hole 101, a second through hole 102 and a third through hole 103 are formed in the shaft 1. The first through hole 101 is communicated with the first cavity 4. There is an axial clearance between the spiral sleeve 2 and the shaft 1 and an axial clearance between the cone 3 and the shaft 1 to form a second cavity 5. The first cavity 4 is communicated with the second cavity 5. Both the second through hole 102 and the third through hole 103 are communicated with the second cavity 5.

During the test, the cone 3 drives the spiral sleeve 2 to rotate at a high speed, and the sand-containing liquid is injected into the first medium container 15. The valve is opened, and a certain amount of the sand-containing liquid is fed into the first cavity 4 through the first through hole 101. The sand-containing liquid flows to the sealing threads 201 on the spiral sleeve 2 along the first cavity 4, and the sealing threads 201 are rotated at a high speed to generate a pumping effect. The sand-containing liquid flows out from the clearance between the sealing threads 201 and the shaft 1 and from the clearance between the cone 3 and the shaft 1, and then flows into the second cavity 5 through the clearance between the cone 3 and the shaft 1. The sand-containing liquid in the second cavity 5 flows out of the device. When the sand-containing liquid in the second cavity 5 is completely drained, the used time is recorded as the time required to drain sand. Meanwhile, the test can also be conducted by using the amount of the drained sand. During the test, the sand-containing liquid is fed into the second medium container 16. The valve is opened, and the sand-containing liquid is fed into the clearance between the shaft 1 and the sealing threads 201 on the spiral sleeve 2 through the second through hole 102 and the third through hole 103. The sand-containing liquid to be injected is weighed in advance. The cone 3 drives the spiral sleeve 2 to rotate. The part of the sand-containing liquid drained out of the device from the second cavity 5 is weighed, and the weight is recorded as the amount of sand which is pumped and drained by the sealing threads 201 on the spiral sleeve 2. The sand draining performance of the sealing threads 201 on the spiral sleeve 2 may be evaluated by comparing the time required to drain sand and the amount of the drained sand, so that the smooth production and application of spiral seal products can be assured.

Specific examples are used herein to illustrate the principle and embodiments of the present invention, which are only used to help understand the methodology and concept of the present invention. Meanwhile, various alterations to the embodiments and applications may come to those skilled in the art according to the concept of the present invention. In conclusion, the description should not be construed as limiting the present invention.

While the present invention has been illustrated by a description of exemplary embodiments and while these embodiments have been described in some detail, it is not the intention of the Applicant to restrict or in any way limit the scope of the appended claims to such detail. Additional advantages and modifications will readily appear to those skilled in the art. The various features of the disclosure may be used alone or in any combination depending on the needs and preferences of the user. Further, features that are described and/or illustrated with respect to one embodiment may be used in the same way or in a similar way in one or more other embodiments and/or in combination with or instead of the features of the other embodiments. This has been a description of the present invention, along with the preferred methods of practicing the present invention as currently known. However, the invention itself should only be defined by the appended claims.

What is claimed is:

1. A horizontal high-speed testing device for a spiral seal of a cone bit bearing, comprising:
    a cone;
    a spiral sleeve, which is in threaded connection to the cone, and an inner diameter of which is provided with sealing threads simulating a spiral seal of a cone bit bearing; and
    a shaft, on which both the spiral sleeve and the cone are sheathed, and in which a first through hole, a second through hole and a third through hole are formed;
    wherein, a first cavity is formed between the spiral sleeve, the cone and the shaft; the first through hole is communicated with the first cavity; there is an axial clearance between the spiral sleeve and the shaft and an axial clearance between the cone and the shaft to form a second cavity; the first cavity is communicated with the second cavity; and, both the second through hole and the third through hole are communicated with the second cavity.

2. The horizontal high-speed testing device of claim 1, further comprising:
    a motor, a base, a cover and a rack, wherein the motor is connected to the cone through a coupler; both the motor and the base are arranged on the rack; the base is detachably connected to the cover; and, all the shaft, the spiral sleeve and the cone are arranged within a chamber formed by the base and the cover.

3. The horizontal high-speed testing device of claim 2, wherein a bearing is additionally provided at a rotation joint of the cone with the base and the cover and fixed by a bearing end cover, and the bearing end cover is connected to the base and the cover by screws.

4. The horizontal high-speed testing device of claim 2, wherein the shaft is connected with the base and the cover by screws, and an axis of the cone is parallel to a plane of the rack.

5. The horizontal high-speed testing device of claim 2, further comprising:
    a collecting tank, wherein the collecting tank is arranged inside the base; a collecting container is further provided on the rack; the collecting tank is communicated with the second cavity; and, the collecting container is communicated with the collecting tank through a pipeline.

6. The horizontal high-speed testing device of claim 1, further comprising:
a first medium container and a second medium container, wherein the first through hole is communicated with the first medium container and the outside through pipelines, respectively, and the second through hole and the third through hole are communicated with the second medium container through pipelines, respectively.

7. The horizontal high-speed testing device of claim 6, wherein valves are additionally provided between the first through hole and the first medium container and between the first through hole and the outside; and valves are additionally provided between the second through hole and the second medium container and between the third through hole and the second medium container.

8. The horizontal high-speed testing device of claim 1, wherein the first through hole is arranged coaxially to the shaft, and the second through hole and the third through hole are symmetrically arranged relative to an axis of the shaft.

* * * * *